United States Patent

Kleck

[11] Patent Number: 5,898,898
[45] Date of Patent: Apr. 27, 1999

[54] COLLATING BITS FROM A BYTE SOURCE

[76] Inventor: James Kleck, 870 Highland Ave., Santa Cruz, Calif. 95060

[21] Appl. No.: 08/656,676

[22] Filed: May 31, 1996

[51] Int. Cl.[6] .......................................... G06F 3/00
[52] U.S. Cl. ................................................. 395/898
[58] Field of Search ........................ 395/898, 411, 395/415, 416, 885; 341/67, 59, 60

[56] References Cited

U.S. PATENT DOCUMENTS 5,497,498  3/1996  Taylor ........................................ 395/284
5,589,829  12/1996  Astle ........................................... 341/67
5,615,020  3/1997  Keith ......................................... 358/426
5,644,306  7/1997  Brent ........................................... 341/67

*Primary Examiner*—Parshotam S. Lall
*Assistant Examiner*—Viet Vu

[57] ABSTRACT

A bit collation method is disclosed which requires a substantially fewer number of clock cycles than the prior art method in separating the bits in a source of bytes and collating them by bit position. A static look-up table is used to spread out the bits in a byte being collated. The look-up table enables simultaneous collation of all bits in a byte using only five clock cycles.

39 Claims, 4 Drawing Sheets

```
    unsigned char cByte;
    unsigned char cBit;
    static unsigned char cAccum [8];

. . .

1.  cByte = GetNextByte ( );

/* collate LSB bit position 0 (LSB) */
2.  cBit = 0X01 & cByte;
3.  cAccum [0] << = 1;
4.  cAccum [0] I = cBit;

/* collate bit position 1 */
5.  cBit = cByte >> 1;    /* shift bit into LSB       */
6.  cBit &= 0X01;         /* clear other bits         */
7.  cAccum[1] <<= 1*      /* make room in accum       */
8.  cAccum[1] I= cBit;    /* OR in the bit            */

/* collate bit position 2 */
9.  cBit = cByte >> 2;
10. cBit &= 0X01;
11. cAccum[2] <<= 1;
12. cAccum[2] I= cBit;

. . .

/* collate bit position 6 */
25. cBit = cByte >> 6;
26. cBit &= 0X01;
27. cAccum[6] <<=1;
28. cAccum[6] I= cBit;

/* collate bit position 7 (MSB) */
29. cBit = cByte >> 7;
30. cAccum[7] <<= 1;
31. cAccum[7] I= cBit;

. . .
```

FIG. 3 unsigned char cByte
unsigned word wSpread Out;
static unsigned word wAccumulate:
. . .

1. cByte = GetNextByte ( );
2. wSpreadOut = LookUp [cByte];
3. wAccumulate &=0X7F7F7F7F7F7F7F7F;
4. wAccumulate << = 1;
5. wAccumulate 1 = wSpreadOut;
. . .

FIG. 6

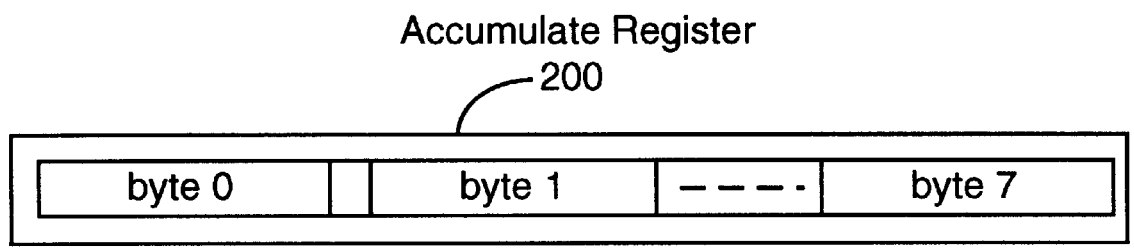

FIG. 7 unsigned char cByte
unsigned word wSpread Out;
static unsigned word wAccumulate:
. . .

1. cByte = GetNextByte ( );
2. wSpreadOut = LookUp [cByte];
3. wAccumulate << = 1;
4. wAccumulate / = wSpreadOut;
. . .

COLLATING BITS FROM A BYTE SOURCE

BACKGROUND

1. Field of the Invention

This invention relates in general to a method for collating bits from a source of bytes. More particularly, it is directed to an efficient method of collating bit subchannels from a buffer holding a number of bytes or a stream of bytes or other sources of bytes.

2. Description of Related Art

In communication systems, it is often the case that upon transmission of data, for example a stream of bytes, the data loses its byte boundaries such that the receiver receives the stream of bytes in some randomly rotated order. In such cases, the data must be reoriented by the receiver before it may be used. The process of reorienting the data typically involves searches by the receiver for a predesignated bit-pattern in the stream of bytes received.

Often times the search for the predesignated bit-pattern requires examination of the bits in the stream of bytes that share a common bit position in their respective bytes. For example, in the area of video signal processing, frame structures containing information such as audio and video data, are transmitted over transmission channels. In accordance with the ITU-T Recommendation H.221, the information to be transmitted is arranged in a frame structure, a typical example of which is shown in FIG. 1 as frame structure 10. As shown in FIG. 1, the frame structure 10 is made up of a stack of 80 bytes of data, each byte consisting of 8 bits. Each column of bits in the frame structure 10 is referred to as a subchannel 20. These subchannels are grouped into what is referred to as a "channel". Each channel contains a specific type of data, and each may have a different number of subchannels. For example, the frame in FIG. 1 comprises three channels, an audio channel 30, a video channel 40 and the service channel 50. The audio channel 30 carries audio data and comprising two subchannels. The video channel 40 carries video data and comprises five subchannels at top of the frame and six subchannels at bottom of the frame. The service channel 50 comprises a segment of one subchannel, and its function is described below.

The ITU-T Recommendation H.221 specifies that a particular frame bit-pattern must occupy the service channel 50. Among other functions, this pattern allows the system receiving the stream of bytes to locate the start of the frame structure and to discover by how many bit positions the bytes have been rotated in the communications channel.

The frame structures are transmitted over the ISDN communication channels continuously in a stream of bytes. As mentioned earlier, during the transmission, the byte boundaries are often lost such that the receiver receives a randomly rotated stream of bytes. FIG. 2 is an example of a rotated frame 100 received by the receiver, wherein the audio channel 30 and video channel 40 are rotated with respect to frame 10 in FIG. 1. Also, note that the service channel 50 is located in between the audio and video channels in frame 100. The receiver then uses the service channel 50 to reorient frame 100 in order to reconstruct frame structure 10. However, the receiver needs to first determine in which subchannel of frame 100 is the service channel 50 located.

In order to locate the service channel 50 in frame 100, an algorithm is typically used which separates and collates by bit position each byte in the stream of bytes received. The algorithm needs to collate the bits in each subchannel in a separate bit-group, and then compare each bit-group against the predesignated bit-pattern. A typical programming routine written in C-language, for collating bits in such manner, is shown in FIG. 3. The programming routine of FIG. 3 will be discussed in conjunction with the drawing of FIG. 4.

FIG. 4 shows a source of n bytes to be collated. FIG. 4 can for example depict the case wherein a series of n bytes forming one or more frame structures, similar to that shown in FIG. 1, are consecutively received and are stacked in the order received. Each byte is shown to consist of 8 bits, wherein the eight bit positions in each byte are designated as bit position 0 through bit position 7 starting with the least significant bit position. The stack of n bytes in FIG. 4 forms 8 bit-columns (subchannels), in one of which the predesignated bit-pattern is located. Hereinafter, each of the eight bit-columns in FIG. 4 will be referred to as a subchannel corresponding to one of the eight bit positions 0–7.

The program routine of FIG. 3 makes use of: i) an 8-bit "Byte" register in which a byte retrieved from the source of bytes in FIG. 4 is held; ii) an 8-bit "Bit" register used to prepare a bit for collation; and iii) eight "Accum" registers, in each of which one of the eight subchannels is collated. The length of each Accum register is dictated by the number of bits in the bit-pattern being sought, i.e., if the bit-pattern being sought is 10 bits in length, each of the eight Accum registers would need to be at least 10 bits in length.

The program code lines 1–31 in FIG. 3 collate eight bits of a byte retrieved from the source of bytes in FIG. 4. Therefore, if for example a total of 10 bytes were to be collated, code lines 1–31 need to be repeated 10 times, once for each byte.

Code line 1 of the program in FIG. 3 retrieves the next byte to be collated from the source of bytes in FIG. 4, placing that byte in the Byte register. Each of the subsequent group of programming code lines 2–4, 5–8, 9–12, . . . , 25–28, and 29–31 collate one bit position of the byte retrieved, starting with the least significant bit position (LSB) and ending with the most significant bit position (MSB), respectively.

Code lines 2–4 collate the least significant bit position (bit position 0) of the Byte register into the Accum register 0. Code line 2 performs a masking step wherein all the bit positions of the Byte register, other than bit position 0, are cleared. This masking operation is carried out by logically and non-destructively ANDing the contents of the Byte register with the binary value 00000001. The result is then placed in the Bit register.

Code line 3 shifts the contents of the Accum register 0 by 1 bit position to the left, thereby opening up the least significant bit position of the Accum register 0. Also, this shift operation preserves the previously collated bits if any.

Code line 4 places the bit value in the bit position 0 of the byte retrieved in the least significant bit position of the Accum register 0. This operation is carried out by logically ORing the contents of the Accum register 0 with that of the Bit register.

Code lines 5–8 collate bit position 1 of the Byte register into the Accum register 1 in a similar manner to the collation routine of code lines 2–4. However, collation of bit position 1 requires an additional shift operation in comparison with the collation routine of code lines 2–4. Since the masking operation clears all but the least significant bit position of the Bit register, it is necessary to shift the bit to be collated to the least significant bit position of the Byte register prior to placing the contents of the Byte register in the Bit register.

This shift operation, shown in code line 5 of FIG. 3, is non-destructive, i.e., in collating bit position 2, the bit value in bit position 2 needs to be shifted two bit positions to the right. Upon completion of the operation of code line 4, bit position 1 of the retrieved byte is collated into the Accum register 1.

All subsequent collation routines are similar to the collation routine of code lines 5–8, except for the collation of the most significant bit position (bit position 7). The collation routine of code lines 29–31 collate bit position 7. As apparent from code lines 29–31, no masking operation is required in collating this bit position because, shifting the bit value in bit position 7 seven bit positions to the right, clears all bit positions other than the least significant bit position (the shifted bit position 7).

Therefore, upon completion of the operation in code line 31, each of the 8 bits in the retrieved byte are collated in one of the eight Accum registers. Repeating code lines 1–31 the requisite number of times will result in collation of the bits in each of the subchannels in FIG. 4 in one of the eight Accum registers, i.e., each of the eight subchannels corresponding to one of the eight bit positions 0–7 in FIG. 4, would be accumulated in the corresponding one of the eight Accum registers 0–7.

A "compare" operation, not shown in FIG. 3, may be carried out after collation of either one byte or a number of bytes. The comparison operation performed after collation of one byte, helps determine whether the bits in the byte collated are part of the predesignated bit-pattern; or alternatively after collation of the requisite number of bytes, the compare operation helps determine which of the 8 Accum registers, if any, contain the predesignated bit-pattern.

Each program code line in FIG. 3 requires one clock cycle to carry out the corresponding operation. Accordingly, a total of 31 clock cycles are required to complete the collation of one byte. As mentioned earlier, the number of times that steps 1–31 need to be repeated depends on the length of the predesignated bit-pattern, i.e., if the predesignated bit-pattern is 10 bits long, the collation routine of steps 1–31 need to be repeated 10 times, thereby requiring a total of 310 clock cycles. As can be seen, as the number of bytes to be collated increases, the number of clock cycles required increase dramatically. Therefore, the collation time can become prohibitive.

SUMMARY OF THE INVENTION

In accordance with the present invention, a bit collation method is disclosed which requires a substantially fewer number of clock cycles than the prior art method in separating the bits in a source of bytes and collating them by bit position. The source of bytes may be a stream of bytes received through a communication medium or simply a number of bytes in a buffer. The method for collating bits a source of bytes, each byte having 8 bits, comprises the following steps:

(a) retrieving a first byte from the source of bytes;

(b) retrieving a spread-out entry from a look-up table, the spread-out entry corresponding to the first byte, the look-up table having one spread-out entry for every possible bit combination in a byte, each bit combination being used as an index for accessing the corresponding spread-out entry in the look-up table, each spread-out entry comprising 8 bit-segments, each of the bit-segments having a first number of bit positions, and the least significant bit position in each of the bit-segments being occupied by the corresponding bit in the byte being collated, all other bit positions in each of the bit-segments being occupied by the bit value 0;

(c) a clearing operation performed on an accumulation register having 8 bit-segments, each bit-segment having a second number of bit positions wherein, the clearing operation clears the most significant bit position in each of the 8 bit-segments;

(d) shifting the contents of the accumulation register one bit position to the left;

(e) ORing the contents of the spread-out entry with the contents of the accumulation register, placing the result in the accumulation register.

(f) repeating the above steps on a number of bytes retrieved successively from the source of bytes wherein, the number of bytes retrieved as well as the first and second number of bit positions are dictated by the number of bits in a predesignated bit-pattern, i.e., if the bit-pattern is 10 bits in length, at least 10 bytes need to be retrieved and each of the first and second number of bit positions must be equal to or greater than 10 bit positions; and (g) comparing the contents of each of the 8 bit-segments in the accumulation register with the predesignated bit-pattern to determine whether the contents of any of the bit-segments in the accumulation register match the predesignated bit-pattern.

Carrying out the operations in each of the steps (a) through (e) in the above sequence would result in collation of one byte. Each of the steps (a) through (e) requires one clock cycle. Accordingly, a total of 5 clock cycles are required to complete the collation of one byte. It can be seen that the task of collating a byte, which the prior art requires 31 clock cycles to complete, can now be accomplished in only 5 clock cycles, an improvement of approximately a factor of six.

BRIEF DESCRIPTION OF THE DRAWINGS

FIG. 3 shows a typical programming routine written in C-language for collating bit subchannels.

FIG. 6 shows a more specific embodiment of the collation routine disclosed in C-programming language in accordance with the present invention.

FIG. 7 shows an Accumulate register having eight bytes.

FIG. 8 shows a more general embodiment of the collation routine disclosed in C-programming language in accordance with the present invention.

DETAILED DESCRIPTION OF THE PREFERRED EMBODIMENTS

In accordance with the present invention, a bit collation method is disclosed which requires a substantially fewer number of clock cycles than the prior art method in separating the bits in a source of bytes and collating them by bit position. For the purposes of this discussion, the CPU being used is assumed to be capable of handling 8-bit bytes and 64-bit words, although CPUs with other byte or word arrangements may also be considered.

The collating method, in accordance with the present invention, uses a static look-up table to "spread" bits out. As will become evident from the following description, the look-up table enables the simultaneous collation of all of the bits in one byte. The look-up table, shown in FIG. 5, contains one 64 bit entry for each possible byte value, i.e., 256 entries. The contents of each 64 bit entry is accessed by its index and is determined in the following manner:

Let the index be written in binary as:
(b7 b6 b5 b4 b3 b2 b1 b0) with b7 as the most significant bit (MSB). Then, the entry in the table corresponding to the above index, namely, LookUp [(b7 b6 b5 b4 b3 b2 b1 b0)], is represented in binary with MSB first, as follows:

0 0 0 0 0 0 0 b7 0 0 0 0 0 0 0 b6 . . . 0 0 0 0 0 0 0 b0

The following are some examples wherein, the 0s in the even bit locations, starting after the 0x on the far right side of each of the following four examples, represents seven 0s:

LookUp[0×81]=LookUp[binary 10000001]=0× 0100000000000001
LookUp[0×FF]=LookUp[binary 11111111]=0× 0101010101010101
LookUp[0×00]=LookUp[binary 00000000]=0× 0000000000000000
LookUp[0×65]=LookUp[binary 01100101]=0× 0001010000010001

A specific embodiment of the collation routine in accordance with the present invention is disclosed in C-programming language in FIG. 6. The programming routine of FIG. 6 will be described in conjunction with the previously described FIG. 4.

Figure 1:
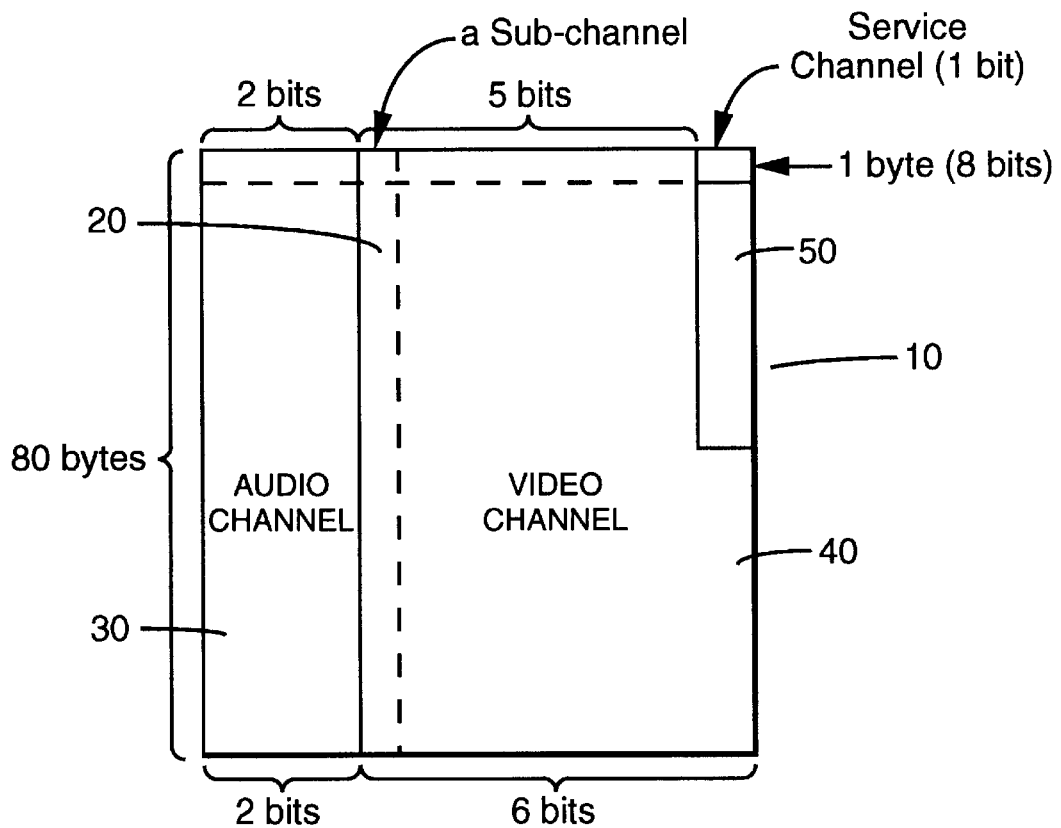
FIG. 1 shows a typical frame structure in accordance with the ITU-T Recommendation H.221.
Figure 2:
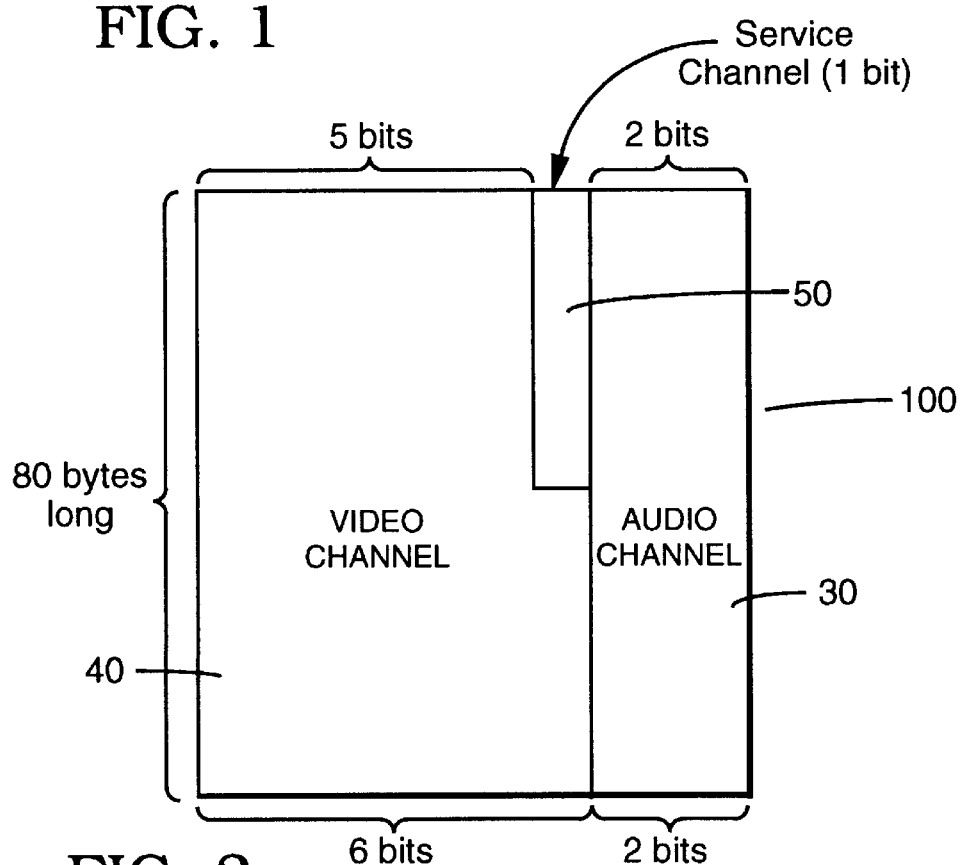
FIG. 2 shows an example of a rotated frame structure received through the ISDN communications channel.
Figures 4, 5:
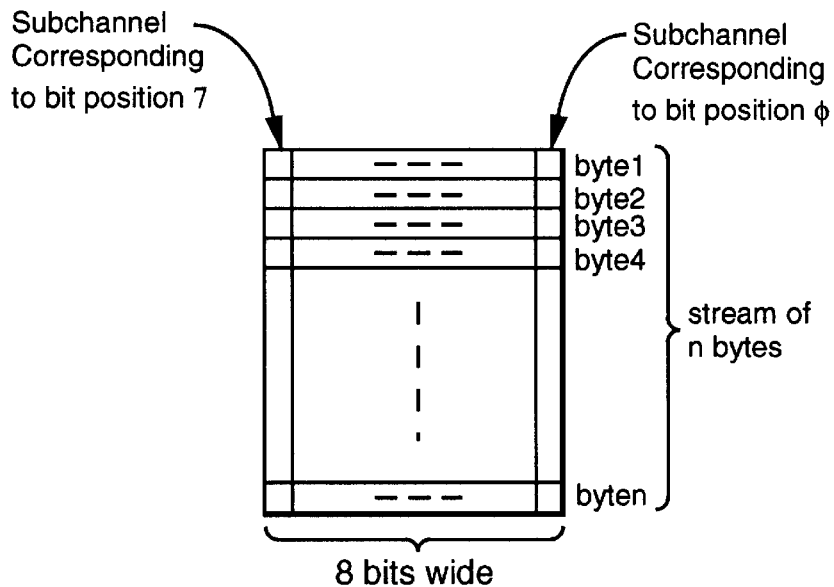
FIG. 4 shows a source of n bytes to be collated.
FIG. 5 shows a look-up table.

The program routine of FIG. 6 makes use of: the above described look-up table; an 8-bit "Byte" register in which a byte retrieved from the source of bytes is held; a 64-bit "SpreadOut" register used to hold the 64-bit entry retrieved from the look-up table; and a 64-bit "Accumulate" register 200 divided into eight bytes (byte 0 - byte 7) as shown in FIG. 7, wherein each of the eight subchannels in FIG. 4 is collated into one of the eight bytes.

The above designation of the length of the Accumulate register 200 assumes that the bit-pattern being sought is 8 bits in length. The length of each of the eight bytes in the Accumulate register 200 is dictated by the number of bits in the bit-pattern being sought, i.e., if the bit-pattern being sought is 10 bits in length, each of the eight bytes in the Accumulate register 200 would need to be at least 10 bits in length.

The program code lines 1–5 in FIG. 6 collate eight bits of a byte retrieved from the source of bytes in FIG. 4. Therefore, if for example a total of 10 bytes were to be collated, code lines 1–5 need to be repeated 10 times, once for each byte.

Code line 1 of the program in FIG. 6 retrieves the next byte to be collated from the source of bytes in FIG. 4, placing that byte in the Byte register.

Code line 2 performs a "spread" operation wherein the contents of the Byte register is used as the index to the look-up table in order to retrieve the spread-out value of the content of the Byte register, placing the spread-out value in the Spreadout register. For example, if the byte register contains the binary number 11111110, then the 254th entry in the look-up table of FIG. 5 is retrieve (the binary number 11111110=254). As shown in FIG. 5, the 254th entry contains the binary number 00000001 in the six left most byte positions, followed by the binary number 00000000 in the right most byte.

Code line 3 performs a "clear high" operation wherein the most significant bit position of each of the 8 bytes in the Accumulate register 200 is cleared in order to prevent overflow in the subsequent shift operation. In the absence of the "clear high" operation, the subsequent shift left operation may result in shifting bit values other than 0 into the least significant bit position of each of the 8 bytes. This would in turn prevent the proper placement of the byte to be collated, in the least significant bit position of each of the 8 bytes. The "clear high" operation is carried out by logically ANDing the contents of each of the eight bytes in the Accumulate register 200 with the binary number 01111111.

Code line 4 performs a "shift" operation wherein the contents of the Accumulate register 200 are shifted left by one bit position, thereby opening up the least significant bit position in each of the eight bytes of the Accumulate register 200 for the eight bits to be collated. Also, this shift operation preserves the previously collated bits in the Accumulate register 200; and Code line 5 performs an "OR" operation wherein, the contents of the SpreadOut register are logically ORed with the contents of the Accumulate register 200. This operation results in placement of each of the eight bits of the retrieved byte in the least significant bit position of each of the eight bytes of the Accumulate register 200.

As apparent from the above sequence, upon completion of the fifth code line, each of the eight bits in the retrieved byte are placed in the correct position in the respective one of the eight bytes in the Accumulate register 200 (i.e. are "collated"). Repeating the above five steps the requisite number of times will result in collation of the bits in each subchannel in FIG. 4 in one of the eight bytes 0–7 in the Accumulate register 200, i.e., each of the eight subchannels corresponding to one of the eight bit positions 0–7 in FIG. 4, would be accumulated in the corresponding one of the eight bytes (bytes 0–7) in the Accumulate register 200.

A "compare" operation, not shown in FIG. 6, may be carried out after collation of either one byte or a number of bytes. The compare operation performed after collation of one byte, helps determine whether the bits in the byte collated are part of the predesignated bit-pattern; or alternatively after the collation of the requisite number of bytes, the compare operation helps determine which of the 8 bytes 0–7 in the Accumulate register 200, if any, contain the predesignated bit-pattern.

Each program code line in FIG. 6 requires one clock cycle to carry out the corresponding operation. Accordingly, a total of 5 clock cycles are required to complete the collation of one byte. It can be seen that the task of collating a byte, which the prior art program routine of FIG. 3 requires 31 clock cycles to complete, can now be accomplished in only 5 clock cycles. Stated otherwise, the 310 clock cycles required by the prior art program routine of FIG. 3 to collate 10 bytes can now be accomplished using only 50 clock cycles, an improvement of approximately a factor of six.

Another more general embodiment of the collation routine in accordance with the present invention is disclosed in C-language in FIG. 8. In accordance with the program routine of FIG. 8, the 8 bits of a byte to be collated are appended to the previously collated bits from corresponding bit positions, using only four operations, a Get, a LookUp, a Shift and an OR operation. However, as in the above disclosed first embodiment, precautions must be taken to ensure that significant bits are not shifted across the byte boundaries in the Accumulate register, i.e., if wAccumulate= 0×0101010101010181 then the shift operation will shift the 0×80 bit into the next bit position range. How this issue is handled depends on the application. The ITU-T Recommendation H.221 application mentioned above, searches for a 7-bit-pattern. Therefore, as in the first embodiment, the high order bit in each bit position range may be cleared prior to the Shift operation by performing:

wAccumulate &=0x7F7F7F7F7F7F7F7F

The collated bits may be examined and discarded, or saved in one or more buffers. Alternatively, operations other than simply collating the bits may be performed. For example, there may be a need to sum up the bits in each bit position. This could be accomplished by logically ADDing the "spread-out" value into the Accumulate register rather than Shifting and logically ORing operations. Here again, one must take precautions for the overflow between bit position ranges in the Accumulate register.

For CPUs with different byte and/or word sizes, different sized lookup tables are required. Also, as in the case of 8-bit bytes and 32-bit words, the byte may be processed one 4-bit nibble at a time which requires a 16 word lookup table (with each entry containing the "spread-out" value for a nibble). Small lookup tables may also be used if storage space is limited. This however results in collation of fewer bits at one time.

The above description of the present invention is intended to be illustrative and not limiting. The invention is further intended to include all variations and modifications falling within the scope of the appended claims.

What is claimed is:

1. A method for collating a bit-group having a plurality of bits, comprising the steps of:
    (a) retrieving a spread-out entry from a look-up table, said spread-out entry corresponding to said plurality of bits in said bit-group, said spread-out entry comprising bit-segments equal in number to said plurality of bits in said bit-group, each of said bit-segments having a first number of bit positions, and one bit position in each of said bit-segments being occupied by the corresponding bit in said bit-group, all other bit positions in each of said bit-segments being occupied by a predesignated bit value; and
    (b) combining said spread-out entry with the contents of an accumulation register, placing the result in said accumulation register.

2. A method as recited in claim 1 wherein, said one bit position in each of said bit-segments in said spread-out entry is the least significant bit position in each of said bit-segments in said spread-out entry.

3. A method as recited in claim 2, wherein said accumulation register comprises bit-segments equal in number to said plurality of bits in said bit-group, each of said bit-segments in said accumulation register having a second number of bit positions.

4. A method as recited in claim 3, further comprising the step of:
    (c) clearing the most significant bit position in each of said bit-segments in said accumulation register immediately after step (a).

5. A method as recited in claim 4, further comprising the step of: (d) shifting the contents of said accumulation register by one bit position to the left, immediately after step (c).

6. A method as recited in claim 5 wherein, said predesignated bit value is a 0.

7. A method as recited in claim 6 wherein, "combining" in said combining step refers to a logical OR operation.

8. A method as recited in claim 7, further comprising the step of:
    (e) comparing the contents of each of said bit-segments in said accumulation register with a predesignated bit-pattern, after step (b).

9. A method as recited in claim 8 wherein, each of said first and second number of bit positions are equal in number to the number of bits in said predesignated bit-pattern.

10. A method as recited in claim 8 wherein, each of said first and second number of bit positions are greater in number than the number of bits in said predesignated bit-pattern.

11. A method as recited in claim 6 wherein, "combining" in said combining step refers to a logical ADD operation.

12. A method for collating bits from a source of bit-groups, each bit-group having a first plurality of bits, comprising the steps of:
    (a) retrieving a first bit-group from said source of bit-groups;
    (b) retrieving a spread-out entry from a look-up table, said spread-out entry corresponding to said first bit-group, said look-up table having one spread-out entry for every possible bit combination in a bit-group, each bit combination being used as an index for accessing the corresponding spread-out entry in the look-up table, each spread-out entry comprising bit-segments equal in number to said first plurality of bits, each of said bit-segments having a first number of bit positions, and the least significant bit position in each of said bit-segments being occupied by the corresponding bit in the bit-group being collated, all other bit positions in each of said bit-segments being occupied by a predesignated bit value;
    (c) shifting the contents of an accumulation register one bit position to the left; and
    (d) combining the contents of said spread-out entry with the contents of said accumulation register, placing the result in said accumulation register.

13. A method as recited in claim 12, wherein said accumulation register comprises bit-segments equal in number to said first plurality of bits, each of said bit-segments in said accumulation register having a second number of bit positions.

14. A method as recited in claim 13, further comprising the step of:
    (e) clearing the most significant bit position in each of said bit-segments in said accumulation register immediately after step (b).

15. A method as recited in claim 14 wherein, said predesignated bit value is a 0.

16. A method as recited in claim 15 wherein, "combining" in said combining step refers to a logical OR operation.

17. A method as recited in claim 16, further comprising the steps of:
    (f) repeating steps (a) through (e) on "X" number of successive bit-groups from said source of bit-groups wherein, "X" is an integer which equals the number of bits in a predesignated bit-pattern; and
    (g) comparing the contents of each of said bit-segments in said accumulation register with said predesignated bit-pattern, to determine whether the contents of any of said bit-segments in said accumulation register match said predesignated bit-pattern.

18. A method as recited in claim 17 wherein, each of said first and second number of bit positions are equal in number to the number of bits in said predesignated bit-pattern.

19. A method as recited in claim 17 wherein, each of said first and second number of bit positions are greater in number than the number of bits in said predesignated bit-pattern.

20. A method as recited in claim 12 wherein, said source of bit-groups is a stream of bytes received through a communication medium.

21. A method as recited in claim 15 wherein, "combining" in said combining step refers to a logical ADD operation.

22. A method for collating a bit-group having a plurality of bits, comprising the steps of:
(a) retrieving a spread-out entry from a look-up table, said spread-out entry corresponding to said plurality of bits in said bit-group, said spread-out entry comprising bit-segments equal in number to said plurality of bits in said bit-group, each of said bit-segments having a first number of bit positions, and one bit position in each of said bit-segments being occupied by the inverted bit value of the corresponding bit in said bit-group, all other bit positions in each of said bit-segments being occupied by a predesignated bit value; and
(b) combining said spread-out entry with the contents of an accumulation register, placing the result in said accumulation register.

23. A method as recited in claim 22 wherein, said one bit position in each of said bit-segments in said spread-out entry is the least significant bit position in each of said bit-segments in said spread-out entry.

24. A method as recited in claim 23, wherein said accumulation register comprises bit-segments equal in number to said plurality of bits in said bit-group, each of said bit-segments in said accumulation register having a second number of bit positions.

25. A method as recited in claim 24, further comprising the step of:
(c) clearing the most significant bit position in each of said bit-segments in said accumulation register immediately after step (a).

26. A method as recited in claim 25, further comprising the step of:
(d) shifting the contents of said accumulation register by one bit position to the left, immediately after step (c).

27. A method as recited in claim 26 wherein, said predesignated bit value is a 1.

28. A method as recited in claim 27 wherein, "combining" in said combining step refers to a logical AND operation.

29. A computer readable medium storing a computer program, the program comprising:
means for collating a bit-group having a plurality of bits, further comprising:
means for retrieving a spread-out entry from a look-up table, said spread-out entry corresponding to said plurality of bits in said bit-group, said spread-out entry comprising bit-segments equal in number to said plurality of bits in said bit-group, each of said bit-segments having a first number of bit positions, and one bit position in each of said bit-segments being occupied by the corresponding bit in said bit-group, all other bit positions in each of said bit-segments being occupied by a predesignated bit value; and
means for combining said spread-out entry with the contents of an accumulation register and placing the result in said accumulation register.

30. A computer readable medium as recited in claim 29 wherein said one bit position in each of said bit-segments in said spread-out entry is the least significant bit position in each of said bit-segments in said spread-out entry.

31. A computer readable medium as recited in claim 30 wherein said accumulation register comprises bit-segments equal in number to said plurality of bits in said bit-group, each of said bit-segments in said accumulation register having a second number of bit positions.

32. A computer readable medium as recited in claim 31, further comprising:
means for clearing the most significant bit position in each of said bit-segments in said accumulation register immediately after said spread-out entry is retrieved from said look-up table.

33. A computer readable medium as recited in claim 32, further comprising:
means for shifting the contents of said accumulation register by one bit position to the left immediately after the most significant bit position in each of said bit-segments in said accumulation register is cleared.

34. A computer readable medium as recited in claim 33 wherein, said predesignated bit value is a 0.

35. A computer readable medium as recited in claim 34 wherein, said combining means performs an OR operation.

36. A computer readable medium as recited in claim 35, further comprising:
means for comparing the contents of each of said bit-segments in said accumulation register with a predesignated bit-pattern after said spread-out entry and the contents of an accumulation register are combined and placed in said accumulation register.

37. A computer readable medium as recited in claim 36 wherein each of said first and second number of bit positions are equal in number to the number of bits in said predesignated bit-pattern.

38. A computer readable medium as recited in claim 36 wherein each of said first and second number of bit positions are greater in number than the number of bits in said predesignated bit-pattern.

39. A computer readable medium as recited in claim 34 wherein, said combining means performs an ADD operation.

\* \* \* \* \*